(12) United States Patent
Maestoso (10) Patent No.: US 8,545,916 B1
(45) Date of Patent: Oct. 1, 2013

(54) METHOD FOR SEPARATING EGG YOLKS FROM EGG ALBUMEN

(71) Applicant: Sergio Maestoso, Fairfield, NJ (US)

(72) Inventor: Sergio Maestoso, Fairfield, NJ (US)

(*) Notice: Subject to any disclaimer, the term of this patent is extended or adjusted under 35 U.S.C. 154(b) by 0 days.

(21) Appl. No.: 13/669,599

(22) Filed: Nov. 6, 2012

(51) Int. Cl.
A23L 1/32 (2006.01)

(52) U.S. Cl.
USPC ........... 426/298; 426/299; 426/478; 426/490; 426/614

(58) Field of Classification Search
USPC .......................... 426/298, 299, 478, 490, 614
See application file for complete search history.

(56) References Cited

U.S. PATENT DOCUMENTS

| 1,462,606 A | 7/1923 | McCrone | |
|---|---|---|---|
| 2,187,488 A | 1/1940 | Brueggman | |
| 4,182,234 A * | 1/1980 | Reed | 99/495 |
| 4,764,387 A | 8/1988 | Willsey | |
| 4,773,322 A * | 9/1988 | Willsey | 99/499 |
| 5,069,119 A | 12/1991 | Idowu | |
| 5,377,583 A * | 1/1995 | Tomosue | 99/500 |
| 5,415,084 A * | 5/1995 | Tomosue | 99/500 |
| 5,438,919 A | 8/1995 | Idowu | |
| 5,527,550 A | 6/1996 | Miles | |
| D499,312 S | 12/2004 | So | |
| D584,575 S | 1/2009 | Courington | |
| 2007/0148316 A1* | 6/2007 | Lee | 426/614 |
| 2012/0003368 A1* | 1/2012 | Lee | 426/299 |

FOREIGN PATENT DOCUMENTS

WO  WO 2007129349  * 11/2007

OTHER PUBLICATIONS

Derwent Abstract for CN101438836 published May 2009.*
Derwent Abstract for CN 202060637 published Dec. 2011.*

* cited by examiner

*Primary Examiner* — Anthony Weier
(74) *Attorney, Agent, or Firm* — Charles E. Baxley (57) ABSTRACT

A method for separating a yolk from albumen of an egg including the steps of assembling the yolk and albumen in a bowl, providing a container that encloses a chamber and has an orifice sized to receive therein the yolk, arranging the orifice to communicate in flow series with the chamber to deliver the yolk thereto, positioning the yolk in the orifice by spatial movement between the orifice and the yolk from the bowl when the container is in a squeezed condition thereof, stripping the yolk of the albumen so as to allow the albumen to return to the bowl while the yolk enters the chamber when the container has moved to a released condition thereof, and changing between the released condition and the squeezed condition is accomplished by alternately squeezing or releasing the container to create or release the vacuum in the chamber.

1 Claim, 11 Drawing Sheets

METHOD FOR SEPARATING EGG YOLKS FROM EGG ALBUMEN

1. BACKGROUND OF THE INVENTION

A. Field of the Invention

The embodiments of the present invention relate to a method for separating a yolk of an egg from albumen of the egg, and more particularly, the embodiments of the present invention relate to a method for separating a yolk of an egg from albumen of the egg utilizing a vacuum created by manually squeezing and then manually releasing a simple hand-held and resilient container.

B. Description of the Prior Art

Numerous innovations for egg separators have been provided in the prior art, which will be described below in chronological order to show advancement in the art, and which are incorporated herein by reference thereto. Even though these innovations may be suitable for the specific individual purposes to which they address, nevertheless, they differ from the embodiments of the present invention in that they do not teach a method for separating a yolk of an egg from albumen of the egg utilizing a vacuum created by manually squeezing and then manually releasing a simple hand-held and resilient container.

(1) U.S. Pat. No. 1,462,606 to McCrone

U.S. Pat. No. 1,462,606—issued to McCrone on Jul. 24, 1923—teaches an egg separator including a conical body portion having a groove near its base, and a separator element removably secured in the groove. The separator element includes a dish-like member having a central opening and a plurality of supporting members extending radially therefrom and adapted to removably engage in the groove.

(2) U.S. Pat. No. 2,187,488 to Brueggman

U.S. Pat. No. 2,187,488—issued to Brueggman on Jan. 16, 1940 in U.S. class 146 and subclass 2—teaches a device for separating the whites from the yokes of eggs, which includes an outer member having an inverted frusto-conical shaped portion surmounting a cylindrical portion and adapted to be positioned on a receptacle, and an inner member having an inverted frusto-conical shaped portion surmounting a cylindrical portion and provided with a bowl depending from the cylindrical portion and normally extending below the lower end of the outer cylindrical portion to receive an egg yolk. The inner member is disposed inside and normally resting on the outer member, and is provided with openings in the cylindrical portion adjacent the bowl to prevent egression of the egg white. The members are arranged for movement relative to each other, whereby egg white suspended from the inner member are automatically sheared off, and the openings of the inner member are sealed.

(3) U.S. Pat. No. 4,764,387 to Willsey

U.S. Pat. No. 4,764,387—issued to Willsey on Aug. 16, 1988 in U.S. class 426 and subclass 299—teaches an apparatus for collecting albumen drippings or stringers from conveyor-mounted egg breaking and separating units. The apparatus includes a collection container with an exhaust opening connected to a vacuum pump, an albumen discharge opening, and an albumen and air intake opening. A vacuum pickup head includes an opening positioned in the travel path of the egg breaking and separating units. The albumen drippings or stringers are drawn through the pickup head inlet opening and into the collection container. An exhaust valve assembly in the collection container closes the exhaust opening when the albumen reaches a predetermined full level, which releases the partial vacuum for discharging the albumen contents. A method of collecting albumen includes the steps of clamping an egg in a breaking and separating unit, cracking the eggshell, separating the eggshell into two parts, dumping the contents into a yolk cup, straining the albumen from the yolk and retaining the yolk in the yolk cup, overflowing the albumen from the yolk cup into an albumen cup, passing the breaking and separating unit by a vacuum pickup head, drawing albumen drippings and air through the pickup head and into a collection container, exhausting air from the collection container, and releasing the albumen contents from the collection container when a predetermined albumen level is reached.

(4) U.S. Pat. No. 5,069,119 to Idowu

U.S. Pat. No. 5,069,119—issued to Idowu on Dec. 3, 1991 in U.S. class 99 and subclass 499—teaches a device for separating the yolk and albumen of eggs after removal from the shell, which includes a cup-shaped member in an upper portion of a unitary housing for receiving an egg, retaining the yolk, and allowing the albumen to overflow the cup-shaped member through surrounding slots into a first chamber in the housing, and a lever being operable thereafter to break the yolk and form an opening in the cup-shaped member for allowing the yoke to flow through a tube extending downwardly through the first chamber into a second chamber. The chambers each have inclined floors and chutes for allowing their respective contents to flow into separate containers. A funnel is, preferably, mounted above the cup-shaped member, together with an anvil, so that the shell of the egg is breakable on the anvil, and the combined yolk and albumen directed into the cup-shaped member by the funnel.

(5) U.S. Pat. No. 5,438,919 to Idowu

U.S. Pat. No. 5,438,919—issued to Idowu on Aug. 8, 1995 in U.S. class 99 and subclass 499—teaches a device for separating the yolk and albumen of an egg. A housing includes an inner chamber and an outer chamber. A lid member is detachably coupled to an upper edge of the housing. The lid member includes an annular member positioned above the inner chamber, and a plurality of slots disposed adjacent to the annular member communicating with the outer chamber. The annular member is sized for retaining the yolk and for causing the albumen to overflow the annular member, with the slots allowing the albumen to flow downwardly into the outer chamber. A lever is pivotally coupled to the annular member. The lever has a bottom portion abutting a bottom edge of the annular member for enabling dispensing of whole yolk retained in the annular member into the inner chamber without breaking the yolk. A funnel is detachably mounted on the lid. The funnel has a bottom opening positioned above the annular member for directing the egg to the annular member. A circumferential flange on a top edge of the funnel provides an anvil for breaking the shell of the egg prior to dispensing the egg in the funnel member. The housing is optionally provided with a closeable spout communicating with the outer chamber. The spout provides facile removal of albumen retained in the outer chamber.

(6) U.S. Pat. No. 5,527,550 to Miles et al.

U.S. Pat. No. 5,527,550—issued to Miles et al. on Jun. 18, 1996 in U.S. class 426 and subclass 478—teaches an egg yolk extractor device and method that removes up to about 90% of the yolk of an egg in such a way that the remaining yolk and white each retain their integrity and appearance when removed from the extractor device. A freshly cracked egg is placed onto the extractor, with the yolk in a central area that generally confines the yolk, but lets the white migrate outwardly. Vacuum is applied beneath the yolk via a small hole, which breaks the yolk membrane and draws out most of the yolk, but tends to retain the membrane together so that the remaining yolk retains its integrity in the membrane.

(7) U.S. Pat. No. Des. 499,312 to So

U.S. Pat. No. Des. 499,312—issued to So on Dec. 7, 2004 in U.S. class D7 and subclass 667—teaches the ornamental design for an egg yolk separator.

(8) U.S. Pat. No. Des. 584,575 to Courington et al.

U.S. Pat. No. Des. 584,575—issued to Courington et al. on Jan. 13, 2009 in U.S. class D7 and subclass 667—teaches the ornamental design for an egg separator.

It is apparent that numerous innovations for egg separators have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a method for separating a yolk of an egg from albumen of the egg utilizing a vacuum created by manually squeezing and then manually releasing a simple hand-held and resilient container.

2. SUMMARY OF THE INVENTION

Thus, an object of the embodiments of the present invention is to provide a method for separating a yolk of an egg from albumen of the egg utilizing a vacuum created by manually squeezing and then manually releasing a simple hand-held and resilient container, which avoids the disadvantages of the prior art.

Briefly stated, another object of the embodiments of the present invention is to provide a method for separating a yolk of an egg from albumen of the egg utilizing a vacuum created by manually squeezing and then manually releasing a simple hand-held and resilient container. The method includes the steps of assembling the yolk of the egg and the albumen of the egg in a bowl, providing the simple hand-held and resilient container that encloses a chamber and has a non-resilient orifice sized to receive therein the yolk of the egg, arranging the non-resilient orifice of the simple hand-held and resilient container to communicate in flow series with the chamber of the simple hand-held and resilient container to deliver the yolk of the egg thereto, organizing the simple hand-held and resilient container so as to allow the simple hand-held and resilient container to be movable between a squeezed condition and a released condition, positioning the yolk of the egg in the non-resilient orifice of the simple hand-held and resilient container by spatial movement between the non-resilient orifice of the simple hand-held and resilient container and the yolk of the egg from the bowl when the simple hand-held and resilient container is in the squeezed condition thereof, stripping the yolk of the egg of the albumen of the egg so as to allow the albumen of the egg to return to the bowl while the yolk of the egg enters the chamber of the simple hand-held and resilient container when the simple hand-held and resilient container has moved to the released condition thereof, and changing between the released condition of the simple hand-held and resilient container and the squeezed condition of the simple hand-held and resilient container is accomplished by alternately squeezing or releasing the simple hand-held and resilient container to create or release the vacuum in the chamber of the simple hand-held and resilient container.

The novel features considered characteristic of the embodiments of the present invention are set forth in the appended claims. The embodiments of the present invention themselves, however, both as to their construction and to their method of operation, together with additional objects and advantages thereof, will be best understood from the following description of the embodiments of the present invention when read and understood in connection with the accompanying figures of the drawing.

3. BRIEF DESCRIPTION OF THE FIGURES OF THE DRAWING

The figures of the drawing are briefly described as follows.

4. LIST OF REFERENCE NUMERALS UTILIZED IN THE FIGURES OF THE DRAWING

A. Introductory.
10 method of embodiments of present invention for separating yolk 12 of egg 14 from albumen 16 of egg 14 utilizing vacuum 18 created by manually squeezing and then manually releasing simple hand-held and resilient container 20
12 yolk of egg 14
14 egg
16 albumen of egg 14
18 vacuum
20 simple hand-held and resilient container B. Steps of Method 10 of Embodiments of Present Invention for Separating Yolk 12 of Egg 14 from Albumen 16 of Egg 14 Utilizing Vacuum 18 Created by Manually Squeezing and then Manually Releasing Simple Hand-Held and Resilient Container 20
22 bowl
24 chamber of simple hand-held and resilient container 20

26 non-resilient orifice of simple hand-held and resilient container 20

5. DETAILED DESCRIPTION OF THE PREFERRED EMBODIMENTS

A. Introductory.

Referring now to FIGS. 1, 2, 3, 4, 5, 6, 7, and 8A to 8D, in which like numerals indicate like parts, and which are, respectively, a diagrammatic perspective view of a yolk of an egg and albumen of the egg together in a bowl, a diagrammatic perspective view of a simple hand-held container being squeezed and having an orifice approaching the yolk of the egg, a diagrammatic perspective view of the simple hand-held container being squeezed and having the orifice thereof contacting the yolk of the egg, a diagrammatic perspective view of the simple hand-held container being released and having the yolk of the egg enter the orifice of the container, a diagrammatic perspective view of the simple hand-held container still being released and having the yolk of the egg leave the bowl and pass the orifice of the container, a diagrammatic perspective view of the simple hand-held container still being released and having the yolk of the egg pass the orifice thereof and enter the container, a diagrammatic perspective view of the albumen of the egg in the bowl and the yolk of the egg in another bowl, thereby separating the yolk of the egg from the albumen of the egg, and a flow chart for carrying out the method of the embodiments of the present invention for separating a yolk of an egg from albumen of the egg utilizing a vacuum created by manually squeezing and then manually releasing the simple hand-held and resilient container, the method of the embodiments of the present invention is shown generally at 10 for separating a yolk 12 of an egg 14 from albumen 16 of the egg 14 utilizing a vacuum 18 created by manually squeezing and then manually releasing a simple hand-held and resilient container 20.

B. The Steps of Method 10 of the Embodiments of the Present Invention for Separating a Yolk 12 of an Egg 14 from Albumen 16 of the Egg 14 Utilizing a Vacuum 18 Created by Manually Squeezing and then Manually Releasing a Simple Hand-Held and Resilient Container 20.

Figure 1:
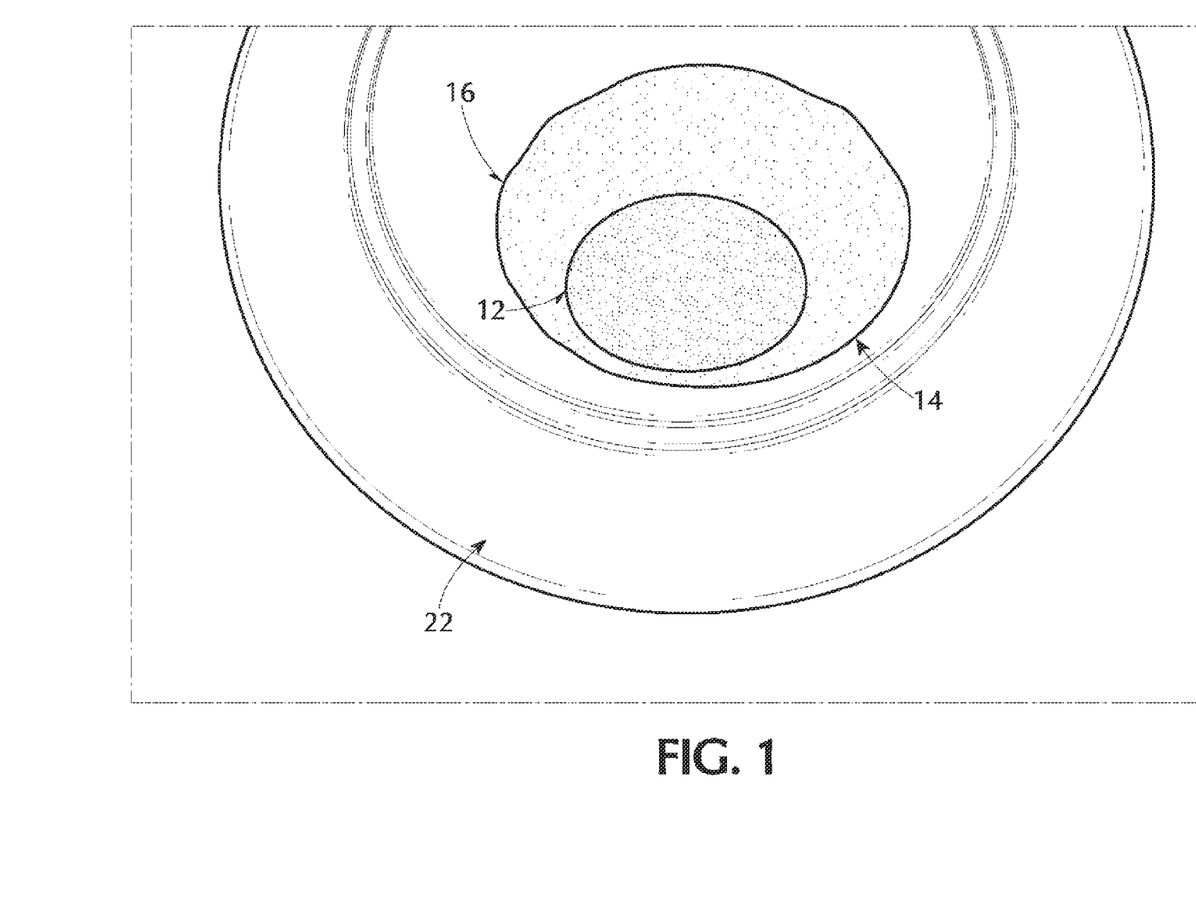
FIG. 1 is a diagrammatic perspective view of a yolk of an egg and albumen of the egg together in a bowl.
Figure 2:
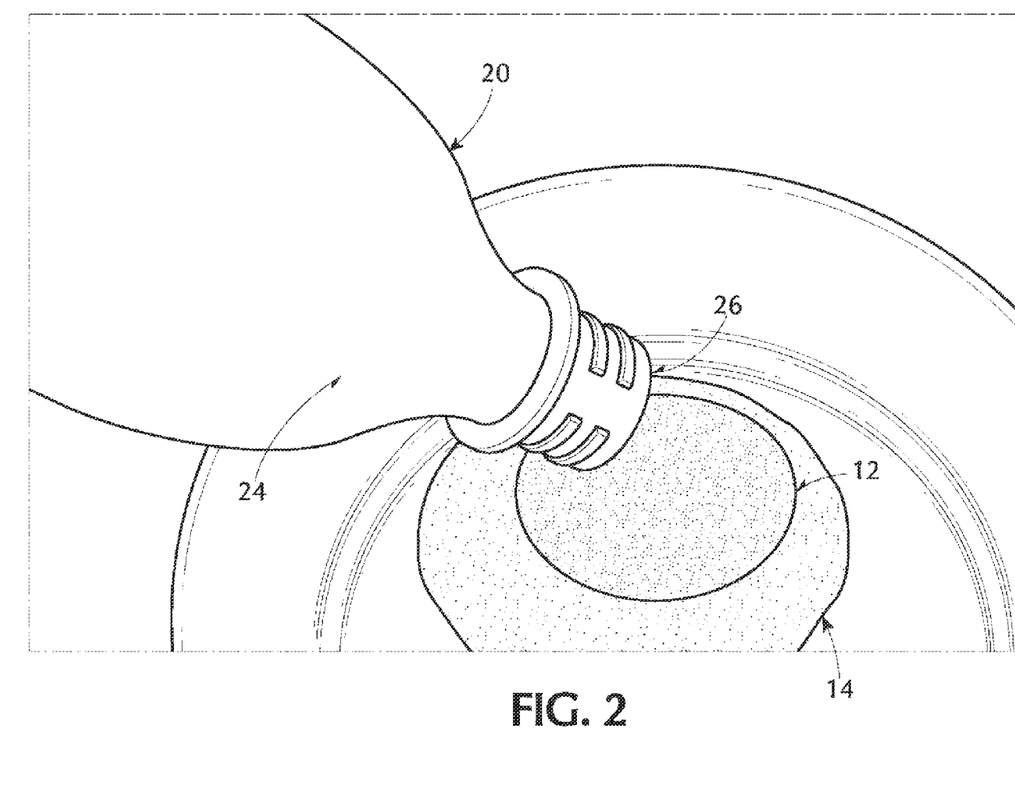
FIG. 2 is a diagrammatic perspective view of a simple hand-held container being squeezed and having an orifice approaching the yolk of the egg.
Figure 3:
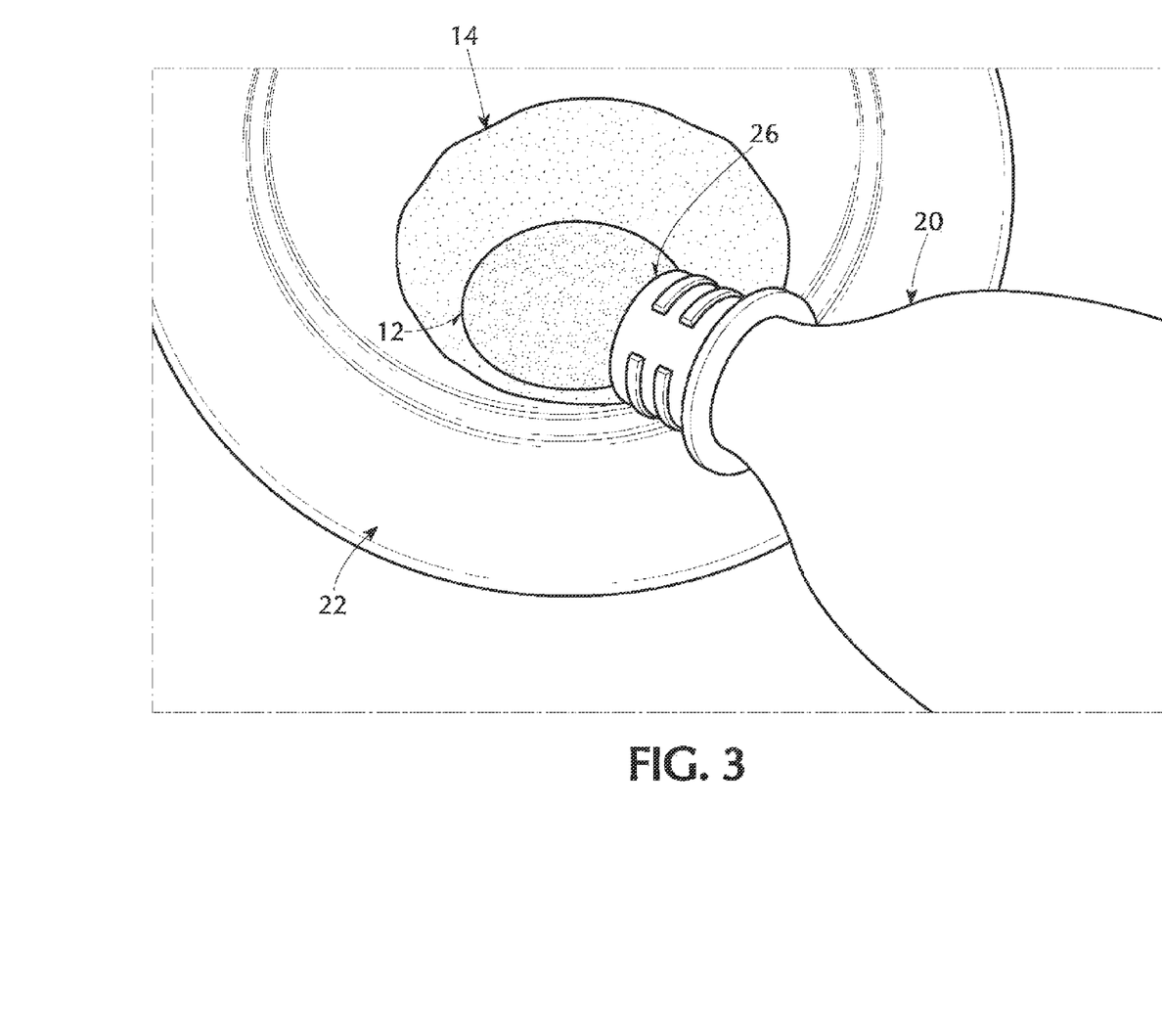
FIG. 3 is a diagrammatic perspective view of the simple hand-held container being squeezed and having the orifice thereof contacting the yolk of the egg.
Figure 4:
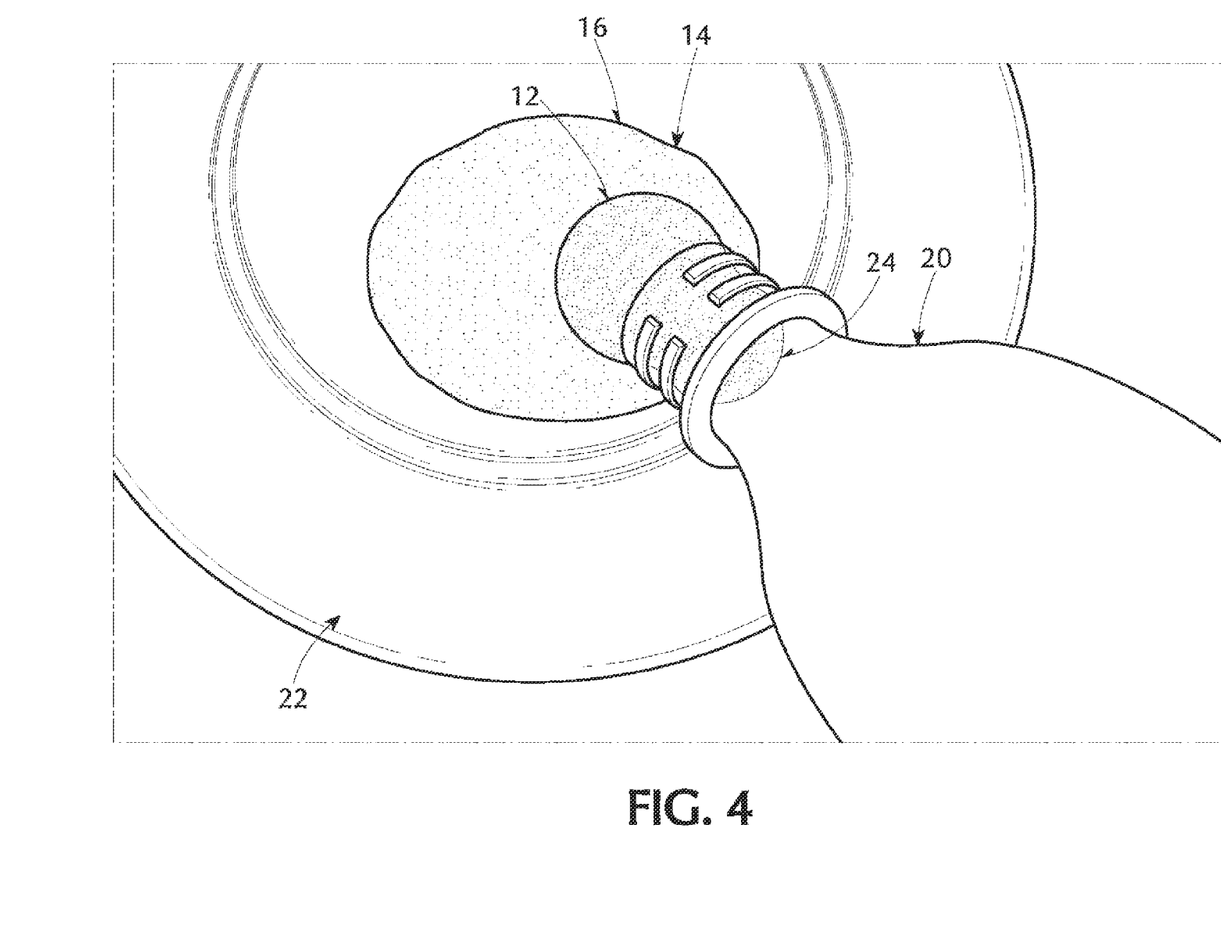
FIG. 4 is a diagrammatic perspective view of the simple hand-held container being released and having the yolk of the egg enter the orifice of the container.
Figure 5:
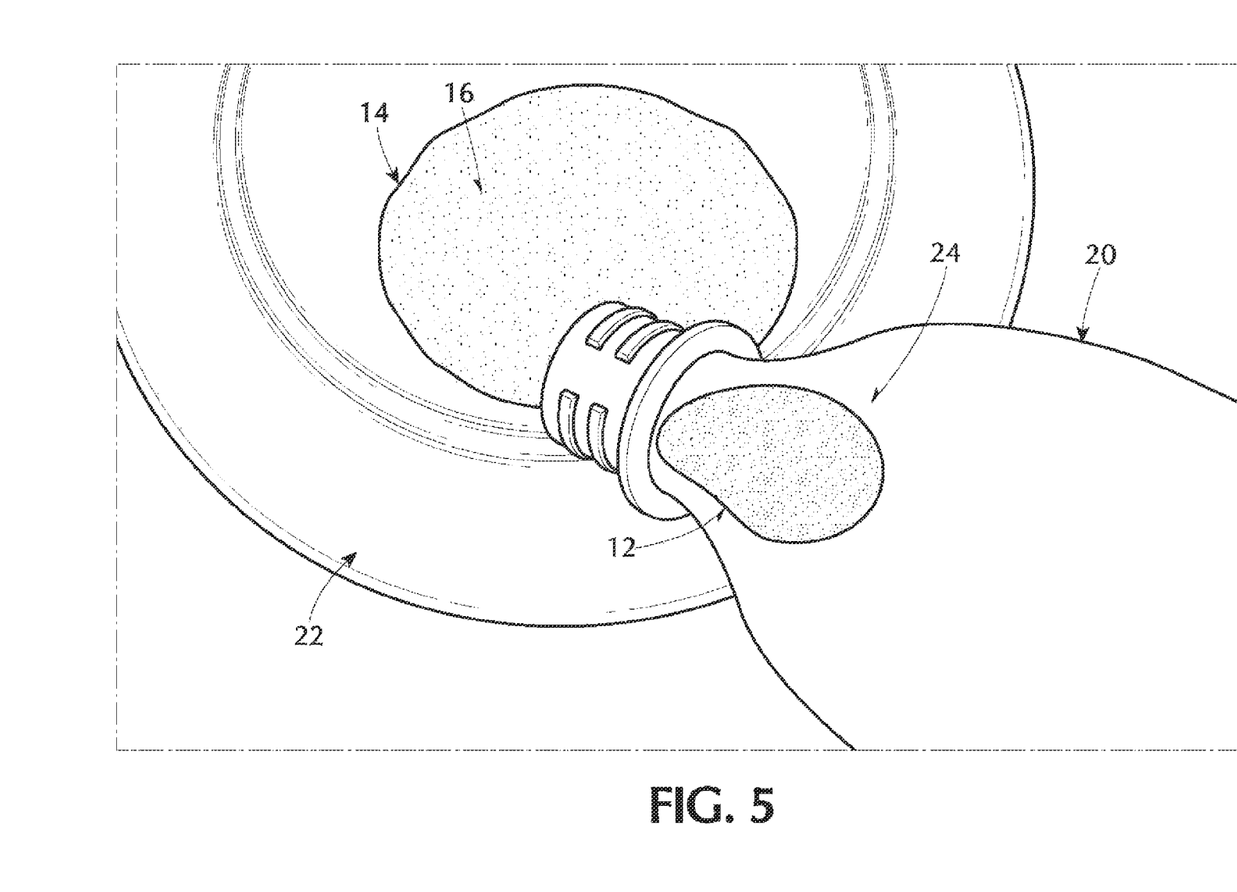
FIG. 5 is a diagrammatic perspective view of the simple hand-held container still being released and having the yolk of the egg leave the bowl and pass the orifice of the container.
Figure 6:
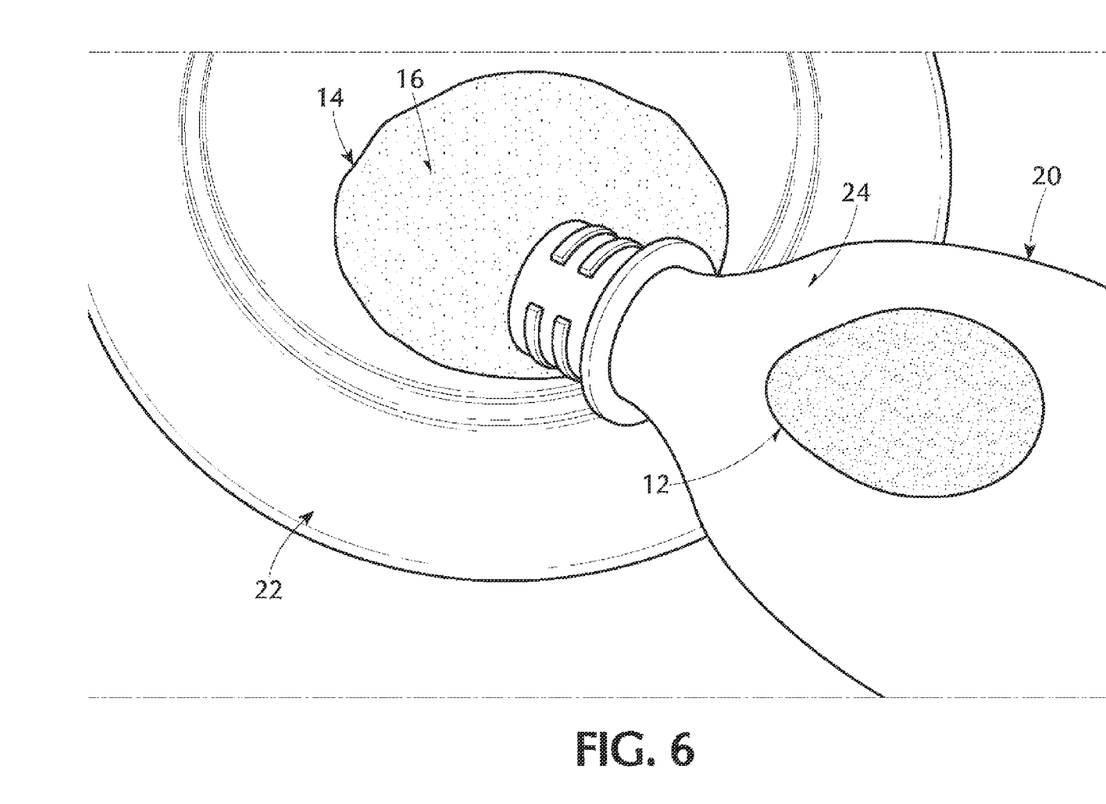
FIG. 6 is a diagrammatic perspective view of the simple hand-held container still being released and having the yolk of the egg pass the orifice thereof and enter the container.
Figure 7:
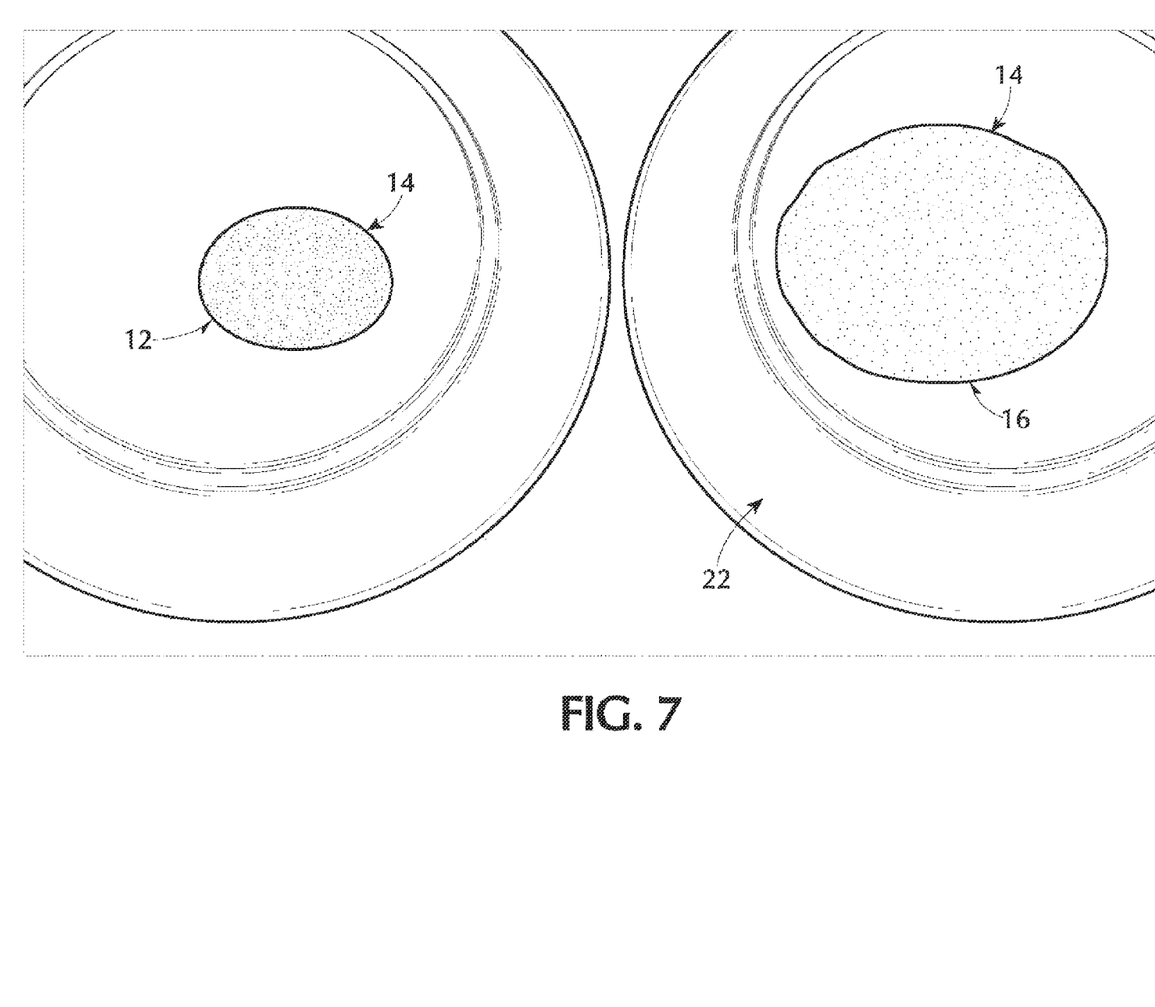
FIG. 7 is a diagrammatic perspective view of the albumen of the egg in the bowl and the yolk of the egg in another bowl, thereby separating the yolk of the egg from the albumen of the egg.
Figure 8A:
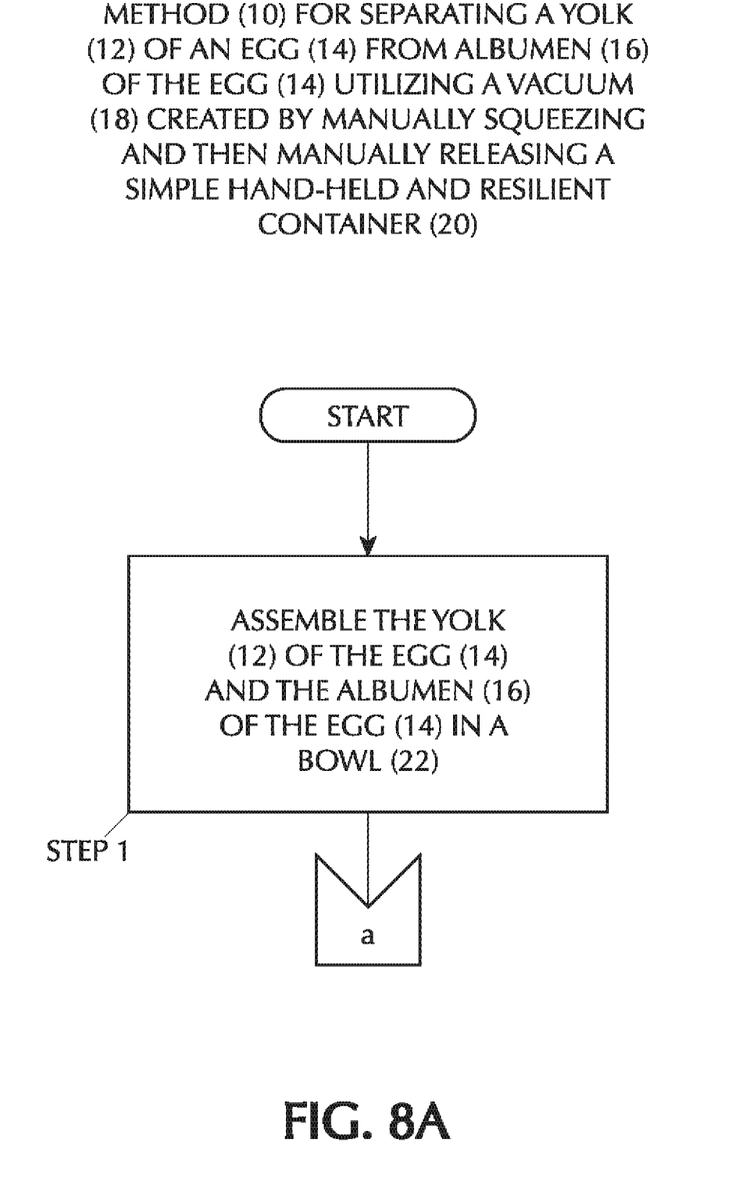
FIGS. 8A, 8B, 8C and 8D are a flow chart for carrying out the method of the embodiments of the present invention for separating a yolk of an egg from albumen of the egg utilizing a vacuum created by manually squeezing and then manually releasing the simple hand-held and resilient container.
Figure 8B:
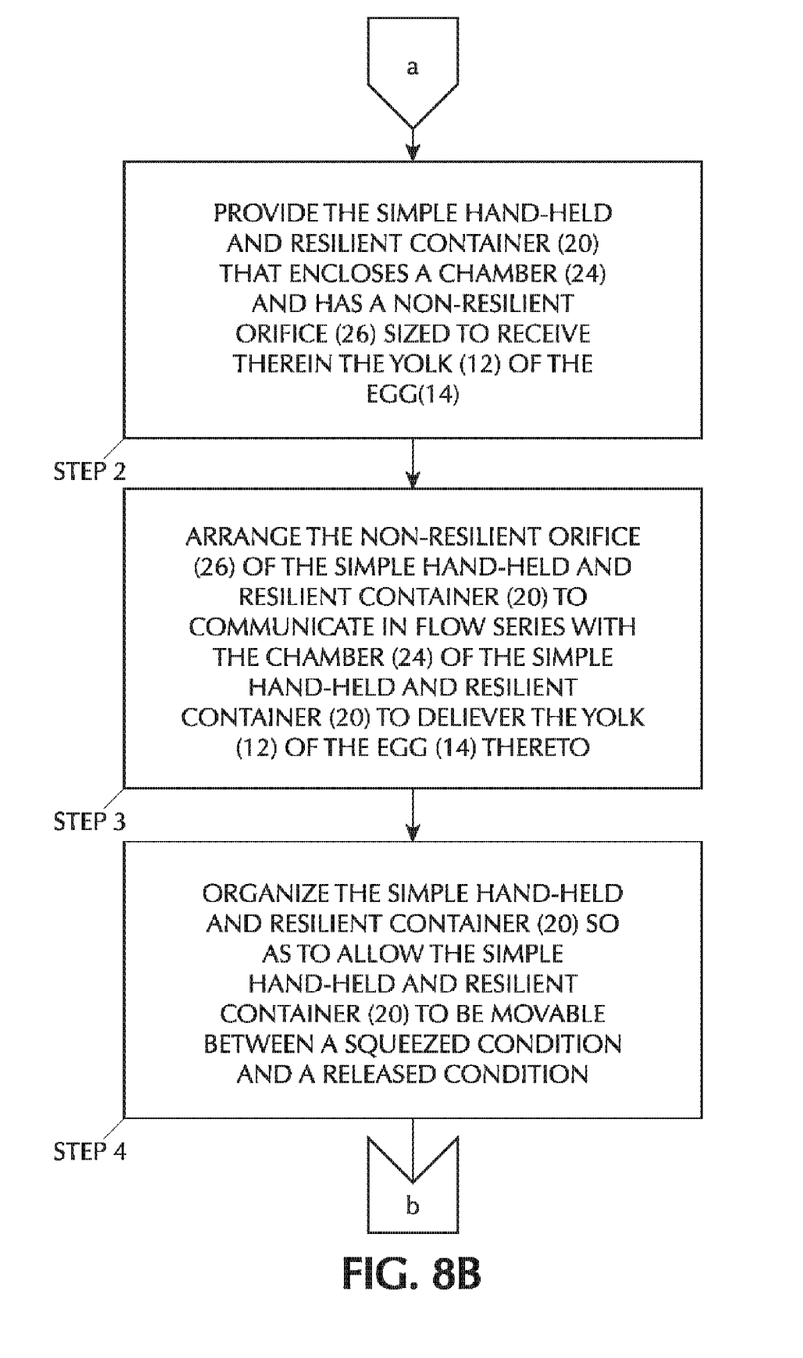
Figure 8C:
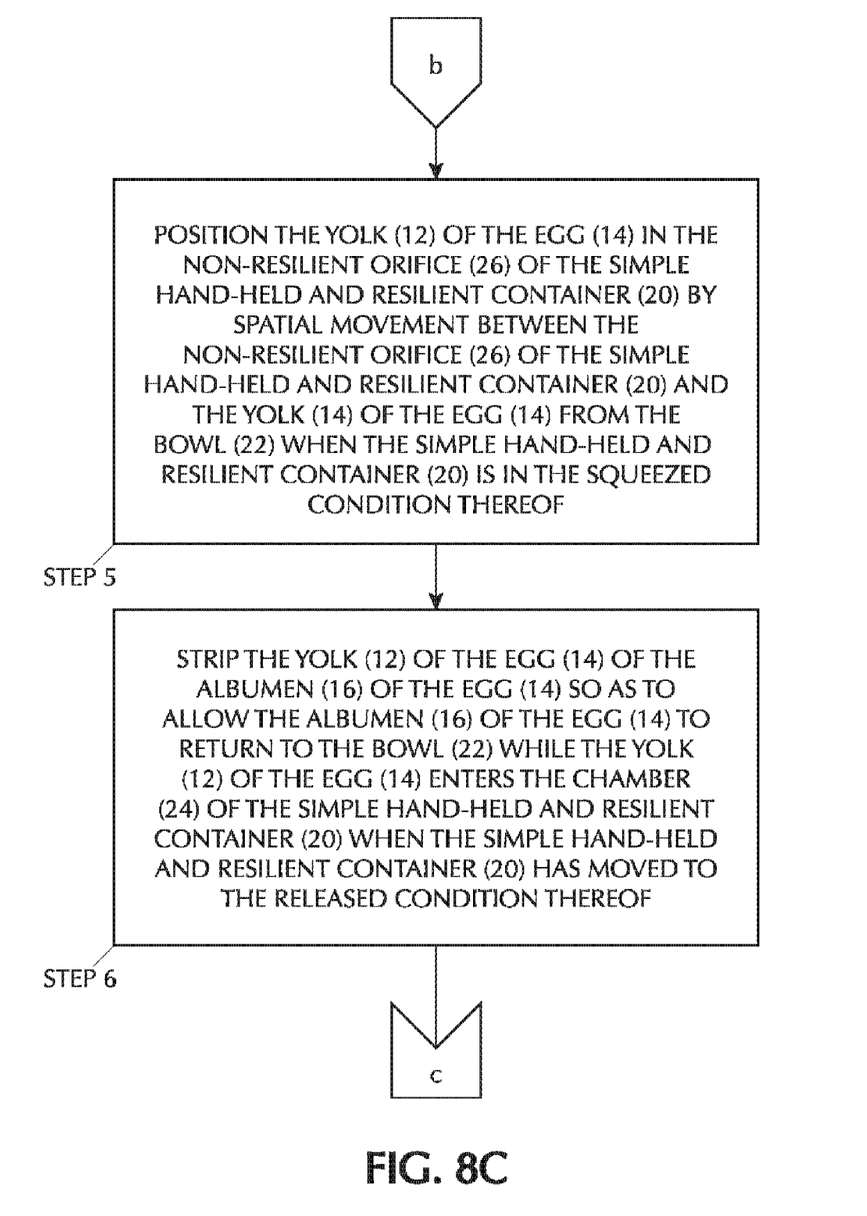
Figure 8D:
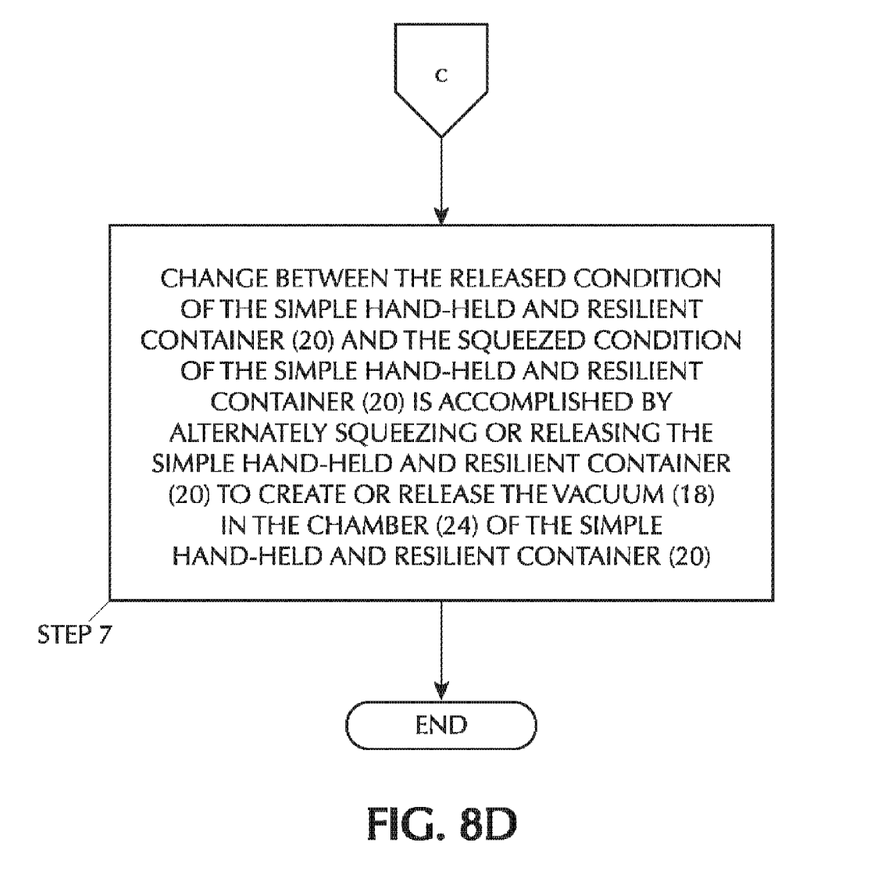

Step 1:

As shown in FIGS. 1 and 8A, assemble the yolk 12 of the egg 14 and the albumen 16 of the egg 14 in a bowl 22;

Step 2:

As shown in FIGS. 2 and 8B, provide the simple hand-held and resilient container 20 that encloses a chamber 24 and has a non-resilient orifice 26 sized to receive therein the yolk 12 of the egg 14;

Step 3:

As shown in FIGS. 2 and 8B, arrange the non-resilient orifice 26 of the simple hand-held and resilient container 20 to communicate in flow series with the chamber 24 of the simple hand-held and resilient container 20 to deliver the yolk 12 of the egg 14 thereto;

Step 4:

As shown in FIGS. 2 and 8B, organize the simple hand-held and resilient container 20 so as to allow the simple hand-held and resilient container 20 to be movable between a squeezed condition and a released condition;

Step 5:

As shown in FIGS. 3 and 8C, position the yolk 12 of the egg 14 in the non-resilient orifice 26 of the simple hand-held and resilient container 20 by spatial movement between the non-resilient orifice 26 of the simple hand-held and resilient container 20 and the yolk 12 of the egg 14 from the bowl 22 when the simple hand-held and resilient container 20 is in the squeezed condition thereof;

Step 6:

As shown in FIGS. 4, 5, 6, 7, and 8C, strip the yolk 12 of the egg 14 of the albumen 16 of the egg 14 so as to allow the albumen 16 of the egg 14 to return to the bowl 22 while the yolk 12 of the egg 14 enters the chamber 24 of the simple hand-held and resilient container 20 when the simple hand-held and resilient container 20 has moved to the released condition thereof; and Step 7:

As shown in FIG. 8D, change between the released condition of the simple hand-held and resilient container 20 and the squeezed condition of the simple hand-held and resilient container 20 is accomplished by alternately squeezing or releasing the simple hand-held and resilient container 20 to create or release the vacuum 18 in the chamber 24 of the simple hand-held and resilient container 20.

C. Impressions.

It will be understood that each of the elements described above or two, or more together, may also find a useful application in other types of constructions differing from the types described above.

While the embodiments of the present invention have been illustrated and described as embodied in a method of separating a yolk of an egg from albumen of the egg utilizing vacuum created by squeezing and then releasing a simple hand-held container, nevertheless, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A method for separating a yolk of an egg from albumen of the egg utilizing a vacuum created by manually squeezing and then manually releasing a simple hand-held and resilient container, comprising the steps of:

a) assembling the yolk of the egg and the albumen of the egg in a bowl;

b) providing the simple hand-held and resilient container that encloses a chamber and has a non-resilient orifice sized to receive therein the yolk of the egg;

c) arranging the non-resilient orifice of the simple hand-held and resilient container to communicate in flow series with the chamber of the simple hand-held and resilient container to deliver the yolk of the egg thereto;

d) organizing the simple hand-held and resilient container so as to allow the simple hand-held and resilient container to be movable between a squeezed condition and a released condition;

e) positioning the yolk of the egg in the non-resilient orifice of the simple hand-held and resilient container by spatial movement between the non-resilient orifice of the simple hand-held and resilient container and the yolk of the egg from the bowl when the simple hand-held and resilient container is in the squeezed condition thereof;

f) stripping the yolk of the egg of the albumen of the egg so as to allow the albumen of the egg to return to the bowl while the yolk of the egg enters the chamber of the simple hand-held and resilient container when the simple hand-held and resilient container has moved to the released condition thereof; and g) changing between the released condition of the simple hand-held and resilient container and the squeezed condition of the simple hand-held and resilient container is accomplished by alternately squeezing or releasing the simple hand-held and resilient container to create or release the vacuum in the chamber of the simple hand-held and resilient container.

\* \* \* \* \*

(12) EX PARTE REEXAMINATION CERTIFICATE (10346th)
United States Patent
Maestoso (10) Number: US 8,545,916 C1
(45) Certificate Issued: Oct. 20, 2014

(54) METHOD FOR SEPARATING EGG YOLKS FROM EGG ALBUMEN

(71) Applicant: Sergio Maestoso, Fairfield, NJ (US)

(72) Inventor: Sergio Maestoso, Fairfield, NJ (US)

Reexamination Request:
No. 90/013,052, Nov. 8, 2013

Reexamination Certificate for:
Patent No.: 8,545,916
Issued: Oct. 1, 2013
Appl. No.: 13/669,599
Filed: Nov. 6, 2012

(51) Int. Cl.
*A23L 1/32* (2006.01)
*G01C 19/5747* (2012.01)

(52) U.S. Cl.
CPC .................................. *G01C 19/5747* (2013.01)
USPC ........... 426/298; 426/299; 426/478; 426/490; 426/614

(58) Field of Classification Search
None
See application file for complete search history.

(56) References Cited

To view the complete listing of prior art documents cited during the proceeding for Reexamination Control Number 90/013,052, please refer to the USPTO's public Patent Application Information Retrieval (PAIR) system under the Display References tab.

*Primary Examiner* — Elizabeth McKane (57) ABSTRACT

A method for separating a yolk from albumen of an egg including the steps of assembling the yolk and albumen in a bowl, providing a container that encloses a chamber and has an orifice sized to receive therein the yolk, arranging the orifice to communicate in flow series with the chamber to deliver the yolk thereto, positioning the yolk in the orifice by spatial movement between the orifice and the yolk from the bowl when the container is in a squeezed condition thereof, stripping the yolk of the albumen so as to allow the albumen to return to the bowl while the yolk enters the chamber when the container has moved to a released condition thereof, and changing between the released condition and the squeezed condition is accomplished by alternately squeezing or releasing the container to create or release the vacuum in the chamber.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claim 1 is cancelled.

\* \* \* \* \*